Jan. 31, 1961  A. S. DE PAUL ET AL  2,970,236
BASE MEMBER SUPPORT MEANS FOR DYNAMOELECTRIC MACHINES
Filed May 29, 1958  2 Sheets-Sheet 1

WITNESSES
John E. Heasley Jr.
Ernest P. Klipfel

INVENTORS
Alseno S. DePaul &
William H. Morse
BY
ATTORNEY

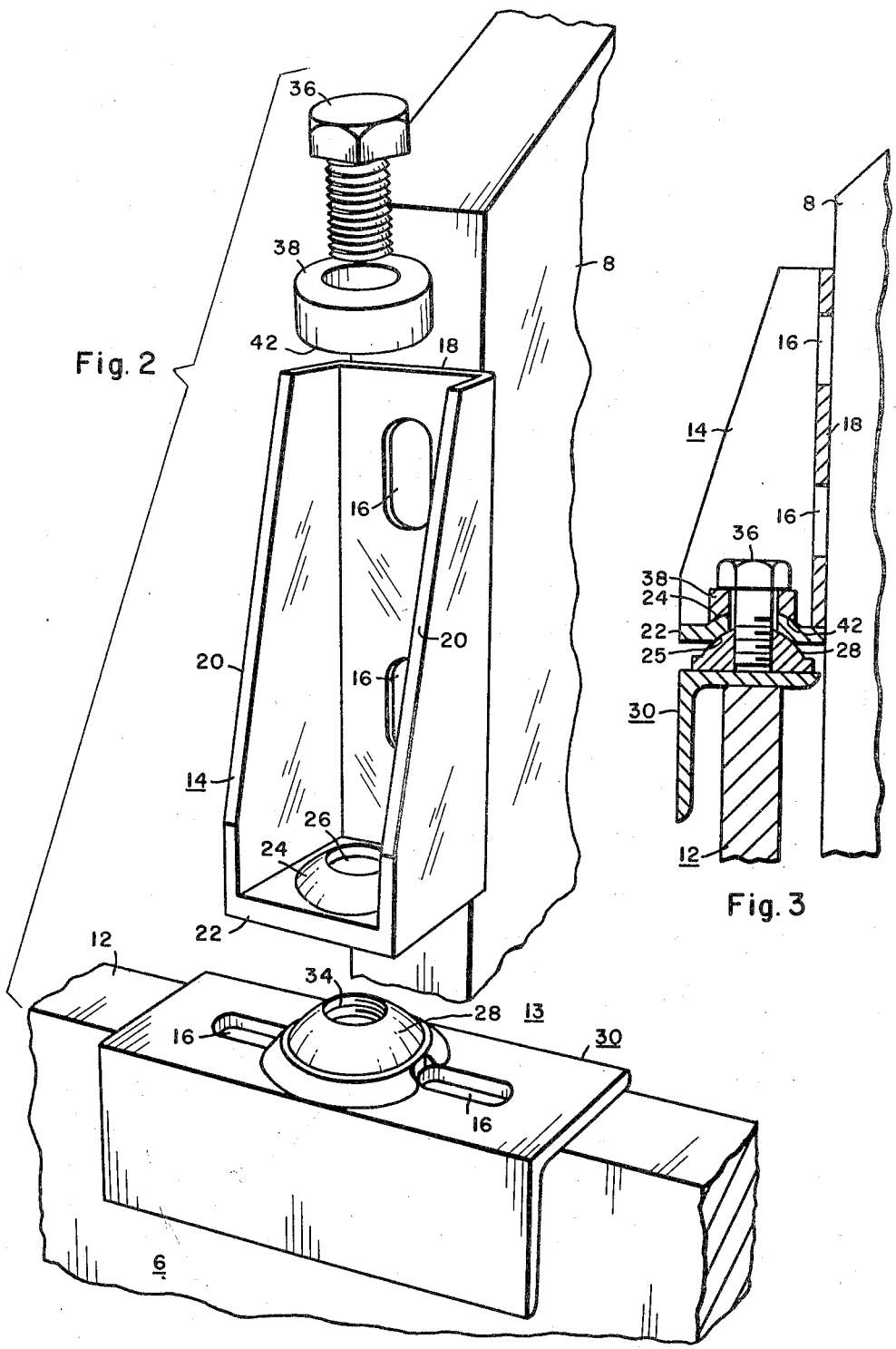

United States Patent Office 2,970,236
Patented Jan. 31, 1961

2,970,236
BASE MEMBER SUPPORT MEANS FOR DYNAMOELECTRIC MACHINES

Alseno S. De Paul, Churchill, and William H. Morse, Penn Hills Township, Allegheny County, Pa., assignors to Westinghouse Electric Corporation, East Pittsburgh, Pa., a corporation of Pennsylvania Filed May 29, 1958, Ser. No. 738,796

4 Claims. (Cl. 310—91)

This invention relates generally to dynamoelectric machines, and more particularly relates to a dynamoelectric machine construction having a stator support allowing easy but accurate assembly and disassembly of the machine.

Our invention relates to a dynamoelectric machine of the general construction described and claimed in the co-pending application of A. S. De Paul et al., Serial No. 731,707, filed April 29, 1958. In a machine of this type the rotor is accurately positioned with respect to the base and supported thereby. The stator is then positioned with respect to the rotor to obtain a proper concentric air gap between the stator and rotor. The positioning of the stator is accomplished independently of the base. The stator, after being properly positioned, is then secured to the base.

Our invention provides a stator support for securing the stator to the base. Any such support must be capable of sufficiently securing the stator to withstand torsional forces tending to uproot the stator from its mounting on the base. If removal of the stator from the base is desired or necessary at a later date, the supporting means must return the stator to the same location previously had to insure a proper air gap.

An object of our invention is to provide a dynamoelectric machine construction having a separable stator support capable of rigidly affixing the stator to the base and supporting the stator weight as well as resisting torsional forces.

Another object of our invention is to provide a dynamoelectric machine construction having a separable stator support allowing easy removal of the stator and thereafter allowing reassembly of the machine so as to automatically have the proper air gap.

Other objects and advantages of our invention will be more fully understood from the following detailed description, taken in connection with the accompanying drawings, in which:

Fig. 2 is an enlarged fragmentary, exploded perspective view of the stator positioning support; and Fig. 3 is a fragmentary, partially in section, view of the stator positioning support as viewed along the line III—III in Fig. 1.

Figure 1:
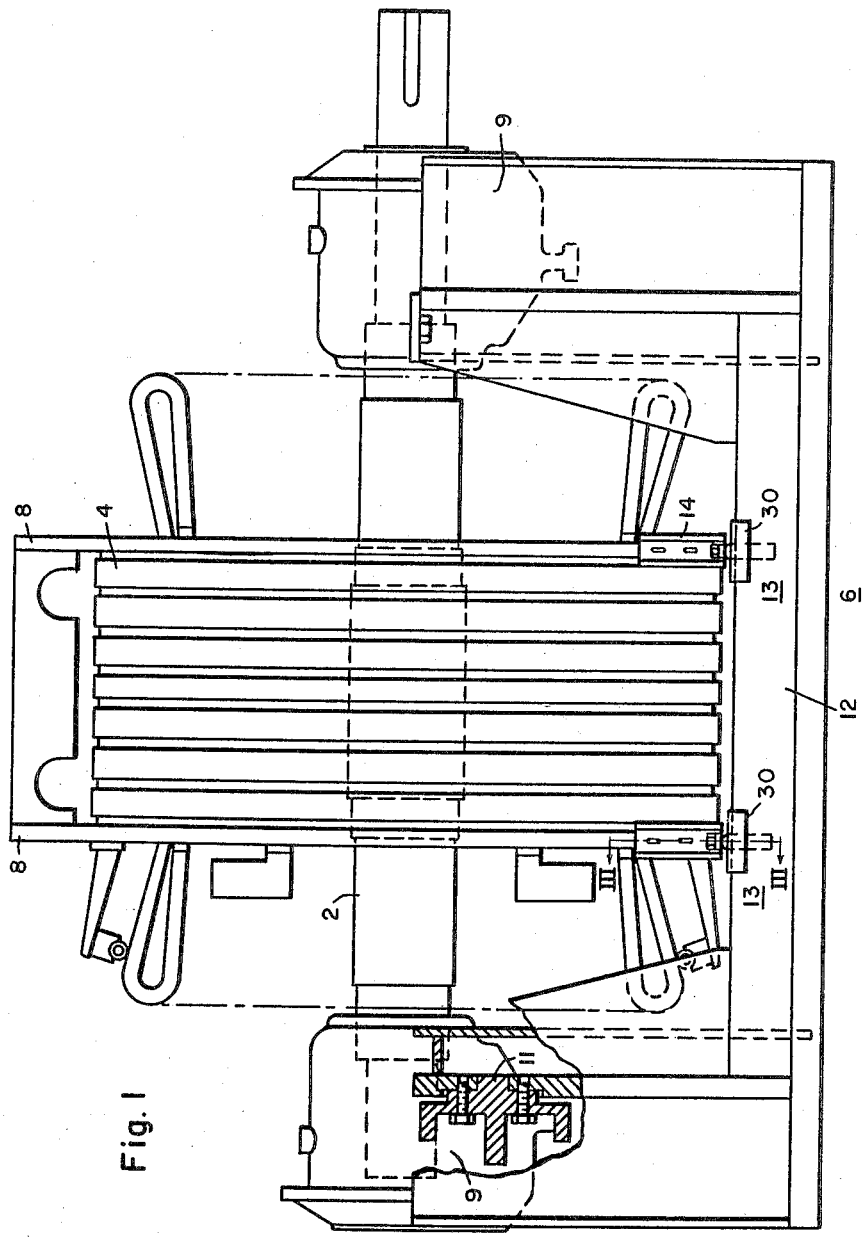
Figure 1 is a side elevation view of a dynamoelectric machine embodying our invention.

The invention is generally applicable to any type of alternating current dynamoelectric machine, and is shown in the drawings embodied in an induction motor having a rotor member 2, stator member 4 and base member 6. The stator 4 is shown with two frame rings 8. The rotor 2 is supported on the base 6 by suitable means such as bearing support members 9 at each end of the base 6. Suitable positioning and aligning means such as dowel fittings 11 on the bearing support members 9 accurately align and position the rotor 2 with respect to the base 6. In the initial assembly of the machines, the stator 4 is positioned with respect to the rotor 2, independently of the base, with a proper air gap as determined by the use of feeler gauges or other means. The stator 4 is then secured to the base 6.

Our invention provides means for securing the stator to the base in such a way that the stator 4 can be removed from the base 6 and returned to exactly the same position. Our invention provides such a securing means through the use of two separable members 14 and 30 having co-operating seating means permitting relative angular movement one to the other and having means for clamping the two members together.

The stator 4 is illustrated secured to the base 6 in four locations. At each location, a securing means 13 is provided consisting of two separable members 14 and 30 as well as a bolt 36 and a washer member 38. The upper member or brace member 14 is shown secured to the bottom end portion of the stator ring 8 while the lower member, shown as an angle member 30, is secured to the base 6. Welding holes 16 are shown in both members 14 and 30 for welding the members 14 and 30 to the stator ring 8 and base 6, respectively. Of course, any suitable means for accomplishing this attachment may be used.

The brace member 14 is shown as having an end 18, two sides 20 and a bottom member 22 which may be integral as shown. The bottom member 22 of the brace member 14 is formed to have a convex spherical seat 24 on its upper surface and a concave spherical seat 25 on its lowest surface. The bottom member 22 is also formed with a bolt opening therethrough as shown at 26. The concave spherical seat 25 is adapted to receive a knob portion 28 which is shown integral with the angle member 30. The knob portion 28 has an opening 34 shown threaded to receive the bolt 36 which extends through the washer member 38 and the bottom member 22 of the brace member 14. A spherical bore 42 at the bottom of the washer member 38 is formed to receive the convex spherical seat 24. The washer member 38 serves as compression means furnishing a seat for the bolt member 36 when it is inserted in the threaded opening 34.

Upon initial assembly of the dynamoelectric machine the securing means 13 each consisting of the brace member 14 and angle member 30, are placed in position at each location where the stator 4 is to be secured to the base 6. At this time the brace member 14 and angle member 30 are bolted together but the bolt 36 is not tightened so that the brace member 14 is free to tilt about the contour of the knob member 28 within the limits of the concave spherical seat 25. The diameter of the bolt opening 26 in the upper member 14 will further limit the free tilting of the upper member 14 about the contour of the knob member 28 once the bolt 36 is inserted into the threaded opening 34. However the clearance between the opening 26 and the bolt 36 is made sufficient to allow a more than adequate angular movement between the brace member 14 and the angle frame 30. In this way, the securing means 13 can adjust itself to the base 6 and stator 4 and align itself properly.

With the stator held in proper position for the desired air gap, the angle member 30 is seated upon the top of an intermediate support portion 12 of the base 6. The brace member 14 is adjusted to be flush with the bottom end portion of the stator ring 8. This adjustment is accomplished while the brace member 14 is seated on the knob portion 28 of the angle frame 30. The brace member 14 is then welded to the stator ring 8 and the angle frame 30 is welded to the intermediate support portion 12. The bolt 36 is tightened into the threaded opening 34 compressing the washer member 38 and clamping the brace member 14 and the angle member 30 together.

It is to be noted that by welding the brace member 14 to the stator ring 8 and the angle member 30 to the intermediate support portion 12 that each securing means 13 and the two members 14 and 30 of each of the securing means 13 are permanently positioned relative to each other for the desired established air gap. This can be further seen by considering the disassembly of the dynamoelectric machine. To remove the stator 4 from the base 6, the bolts 36 are removed allowing the stator 4 with the brace member 14 to be lifted from the base 6 having the angle member 30. Upon reassembly, each upper member 14 has its concave spherical seat 25 placed upon the knob portion 28 of the corresponding angle member 30. At each location where the stator is secured to the base, the concave spherical seat 25 will find its proper location relative to the angle member 30. This is true since the brace member 14 and the angle member 30 have been previously angularly adjusted during initial assembly of the dynamoelectric machine. The point of contact by the knob portion 28 within the concave spherical seat 25 has been predetermined at each location where the stator is secured to the base. The concave spherical seat 25 when placed upon the knob portion 28 will automatically make the correct point of contact at each location when each brace member is closely held in contact with its angle member 30. To clamp the stator 4 to the base 6, the bolt 36 at each location is tightened in the angle member 30 with the washer member 38 again furnishing a proper seat for each bolt 36. Thus, upon reassembly, the stator 4 is again in the exact same position with respect to the base 6 as previously occupied.

Our invention has provided a dynamoelectric machine construction capable of attaining a proper air gap at all times in an inexpensive time saving manner. The stator is rigidly fastened and supported by the base member through the separable brace member 14 and angle member 30. Upon securing the bolts 36, the stator weight is rigidly supported by the base 6 and the torsional forces tending to lift the stator 4 from the base 6 are successfully resisted. If it should be desirable to remove the stator 4 from the base 6, our invention allows reassembly of the stator 4 to the base 6 without the necessity of resetting the air gap. This is accomplished by the relative self-positioning of the brace member 14 and the angle member 30 at each location where the stator 4 is secured to the base 6. These two members are small and can be accurately made in an inexpensive manner. The stator 4 and base 6 are generally large and the relative cost of making the stator 4 and base 6 accurate enough for direct assembly one on the other would be high.

While our invention has been described with a certain degree of particularity and certain preferred embodiments of the invention have been shown and described for the purpose of illustration, it is to be understood that our invention is not limited to these specific arrangements, and in its broadest aspects, includes all equivalents, embodiments and modifications which come within the spirit and scope of our invention. The invention is not necessarily limited to dynamoelectric machine but has application to any construction wherein accurate self-positioning and locating of one member relative to another member is desired.

We claim as our invention:

1. A dynamoelectric machine having a base member, a rotor member supported on the base member, a stator member, and a plurality of securing and positioning means for attaching the stator member to the base member, each of said securing and positioning means comprising a first member secured to the stator member, a second member secured to the base member, said first member having a lower concave spherical surface and said second member having an upper convex spherical surface, said spherical surfaces engaging each other to accurately position the stator member with respect to the base member, a washer having a spherical surface engaging a corresponding spherical surface on the first member, and a clamping bolt engaging said washer member and extending through the first and second members for clamping them rigidly together.

2. In a dynamoelectric machine having a base member, a rotor member supported on the base member, and a stator member, means for rigidly securing the stator member on the base member comprising a plurality of securing means, each of said securing means including an upper member adapted to be permanently attached to the stator member, a lower member adapted to be attached to the base, and clamping means for holding said upper and lower members together, the upper member having a concave spherical surface and the lower member having a convex spherical surface, said spherical surfaces engaging each other to permit relative angular movement of the members prior to their attachment to the stator member and the base member, and a washer having a spherical surface engaging a corresponding spherical surface on the upper member, said clamping means engaging the washer and extending through the upper and lower members to normally clamp them rigidly together, the clamping means being removable to permit removal of the stator member from the base member and accurate replacement thereon in its original position as determined by said engaging spherical surfaces of all the securing means.

3. A dynamoelectric machine having a base member, a rotor member supported on the base member, a stator member, and a plurality of securing and positioning means for attaching the stator member to the base member, each of said securing and positioning means comprising a first member secured to the stator member, a second member secured to the base member, one of said members having a concave spherical surface and the other of said members having a convex spherical surface, said spherical surfaces engaging each other to accurately position the stator member with respect to the base member, a washer having a spherical surface engaging a corresponding spherical surface on the first member, and a clamping bolt engaging said washer member and extending through the first and second members for clamping them rigidly together.

4. In a dynamoelectric machine having a base member, a rotor member supported on the base member, and a stator member, means for rigidly securing the stator member on the base member comprising a plurality of securing means, each of said securing means including an upper member adapted to be permanently attached to the stator member, a lower member adapted to be attached to the base, and clamping means for holding said upper and lower members together, one of said members having a concave spherical surface and the other of said members having a convex spherical surface, said spherical surfaces engaging each other to permit relative angular movement of the members prior to their attachment to the stator member and the base member, and a washer having a spherical surface engaging a corresponding spherical surface on the upper member, said clamping means engaging the washer and extending through the upper and lower members to normally clamp them rigidly together, the clamping means being removable to permit removal of the stator member from the base member and accurate replacement thereon in its original position as determined by said engaging spherical surfaces of all the securing means.

References Cited in the file of this patent

UNITED STATES PATENTS

| | | |
|---|---|---|
| 1,618,962 | Lincoln | Feb. 22, 1927 |
| 1,634,084 | Ruths | June 28, 1927 |
| 1,786,192 | Cullman | Dec. 23, 1930 |
| 1,968,582 | Wood | July 31, 1934 |
| 2,739,773 | Rougemont | Mar. 27, 1956 |

FOREIGN PATENTS

| | | |
|---|---|---|
| 35,519 | Netherlands | May 15, 1935 |
| 504,653 | Belgium | July 31, 1951 |